M. COVEL.

SAW SHARPENING MACHINE.

No. 10,099. Reissued May 2, 1882.

WITNESSES—
F. B. Tormund
L. M. Freeman

INVENTOR—
Milo Covel
By G. B. Coupland & Co
atty

N. PETERS. Photo-Lithographer, Washington, D. C.

2 Sheets—Sheet 2.

M. COVEL.

SAW SHARPENING MACHINE.

No. 10,099. Reissued May 2, 1882.

WITNESSES—
F. B. Townsend
L. M. Freeman.

INVENTOR—
Milo Covel
By G. B. Coupland & Co
attys

N. PETERS, Photo-Lithographer, Washington, D. C.

UNITED STATES PATENT OFFICE.

MILO COVEL, OF CHICAGO, ILLINOIS.

SAW-SHARPENING MACHINE.

SPECIFICATION forming part of Reissued Letters Patent No. 10,099, dated May 2, 1882.

Original No. 180,115, dated July 25, 1876. Application for reissue filed February 21, 1882.

*To all whom it may concern:*

Be it known that I, MILO COVEL, of Chicago, in the county of Cook and State of Illinois, have invented certain new and useful Improvements in Saw-Sharpening Machines; and I do hereby declare that the following is a full, clear, and exact description of the same, and which will enable others skilled in the art to which my invention appertains to make and use my improvements, reference being had to the accompanying drawings, forming a part hereof, and in which—

Figure 1:
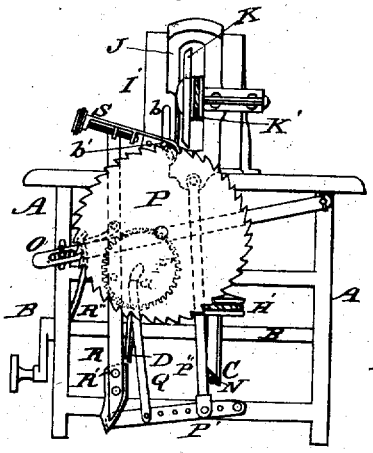
Figure 2:
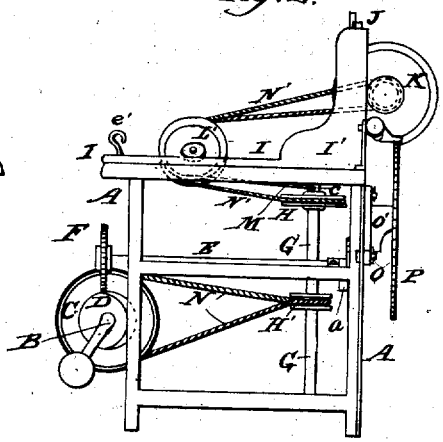
Figure 3:
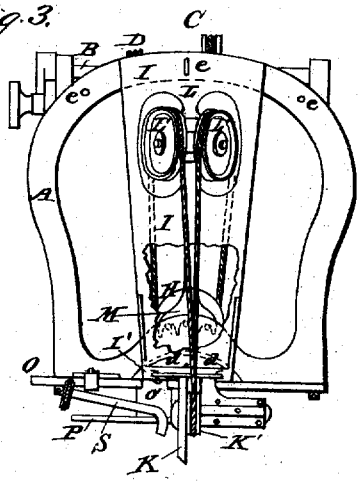
Figure 4:
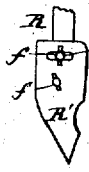
Figure 5:
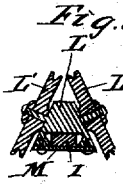
Figure 6:
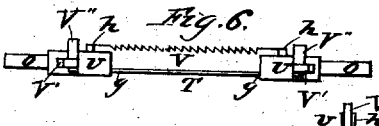
Figure 7:
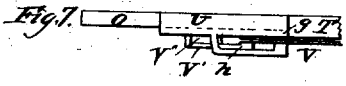
Figure 8:
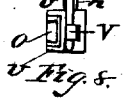
Figure 9:
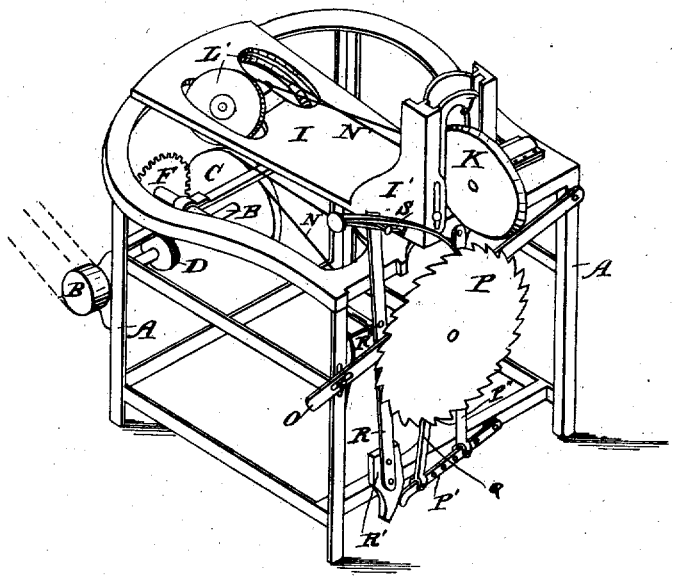

Figure 1 is a front elevation of a machine embodying my invention; Fig. 2, a side elevation thereof; Fig. 3, a top or plan view of the same; Fig. 4, a rear elevation of the guide or former; Fig. 5, a vertical cross-section of the saddle and pulleys; Fig. 6, a side elevation of a straight saw arranged in a fastening adapted for attachment to a sharpening-machine; Fig. 7, a top or plan view of the parts shown in Fig. 6; Fig. 8, an end elevation of the same, and Fig. 9 a perspective view of machine.

Like letters of reference indicate like parts.

This invention relates to that class of saw-sharpening machines which are automatic in their action.

My object is to improve in several respects the construction and operation of this class of machines; and to that end my invention consists in the several novel features hereinafter specifically set forth.

In the drawings, A represents the frame of the machine. B is the main driving-shaft, and C is a belt-wheel or pulley mounted thereon. D is a perpetual screw on the shaft B. E is a crank-shaft having thereon the crank-arm *a*, and F is a spur-wheel on the shaft E, and is arranged to engage the screw D. G is an intermediate driving-shaft, and H and H′ are belt-wheels or pulleys mounted thereon. All these shafts have suitable bearings in the frame, and the size of the pulleys is such as to increase the speed or motion imparted by the driving-screw.

I is an adjustable top piece having a vertical part, I′, in which latter is arranged the gate J.

*b* is an angular slot in the part I′, and *b′* is a pin passing through this slot and carried by the gate J.

K is an emery-wheel mounted in a bearing carried by the gate J.

K′ is a pulley on the axle or arbor of the wheel K. The emery-wheel is vertically arranged, and has a beveled edge, as shown.

L is a saddle mounted freely on a bar or ridge forming a part of the top I.

L′ L′ are inclined pulleys pivoted to the saddle L.

M is a brace attached at one end to the saddle, and the other rests against the shaft G and the fixed pins *c c*, the latter of which lie in a line extending across the top piece, the brace being forked or cut or notched to receive the shaft and pins, as represented by broken lines in Fig. 3. The saddle L is capable of a slightly swinging or tilting movement on its bridge in a lateral direction and in a horizontal plane, and also of a sliding movement thereon while the part I is being shifted or adjusted. The bridge is broadest at its central part, and hence as the saddle is pushed rearward and reaches the narrow part of the bridge room is left between the saddle and the bridge to admit of the tilting movement referred to. This sliding and tilting movement is caused for the reason that the brace M is at one end rigidly attached to the saddle, while the other end rests against fixed bearings some distance from the center on which the table I turns.

N is a driving-belt arranged over the pulleys C and H′, and N′ is also a driving-belt arranged over the pulleys H, L′ L′, and K′, as shown. The frame A is cut away in the arc of a circle, as represented at *d*, Fig. 3, and the center of this circle is in a line passing vertically through the center of the emery-wheel. The top piece is shouldered or lipped to lap or engage the curved part *d*. By this means the top piece may be swung laterally, as if pivoted at a point lying in a line passing vertically through the center of the emery-wheel.

*e e* are holes in the frame A, and *e′* is a pin passing through the part I and adapted to enter any of the holes *e e*, so that the top piece, when adjusted by being swung laterally, may be thus held in any desired position. It will be observed by referring to Figs. 2 and 3 that the pulleys L′ L′ are so inclined that the lower part of the belt N′ is held in a position corresponding to the size of the pulley H, and that the upper part of the belt runs so as not to be liable to leave the pulley K′.

O is a pivoted arm, beveled slightly on its upper and lower edges, and carrying a block, O′, adjustably mounted thereon. P is a circular-saw attachment to this block in such a manner as to be firmly held, but capable of being rotated. The arm O is inclined, as shown, and one end may be adjusted at various heights by means of a vertical slot in the frame A and a horizontal slot near the end of the arm, in connection with a bolt passing through the slots, so that the parts may be tightly clamped together when the arm is set at any desired position.

The saw may be rendered adjustable on the arm O by means of an adjusting-screw passing through the block O′ and through a fixed stud; but as this means of rendering the saw adjustable on its supporting-arm has heretofore been employed I have not here shown an adjusting-screw arranged to perform this function, and have only intended to suggest a way of producing the result referred to.

P′ is a pivoted perforated lever or arm, and P″ is a connecting-arm pivoted to the gate J and swivel-jointed to the arm P′.

Q is a pitman carried by the arm *a* and connected to the arm P′. The arm P″ and pitman Q may be adjusted on the arm P′ by passing their pivots through any of the perforations in the latter arm.

R is a pivoted lever, on the lower end of which is fastened the former or guide R′, arranged for contact with the free end of the arm P′. This former is removable from its arm. It is also slotted, as shown at *f*, so that it may be rocked on a pivot, *f*′, extending from the lever R, and then clamped by means of a pin or nut employed in connection with a pin, *f*″, extending from the lever and passing through the slot *f*. The former is firmly held against the arm P′ by means of a spring, R‴.

S is an adjustable push-pawl pivoted to the upper end of the lever R, and is arranged to engage the teeth of the saw.

In order to file circular saws by means of the machine now described, the saw is first firmly attached to the block O′, but so as to be capable of being rotated, and the block O′ and arm O are then so adjusted that the emery-wheel will lie on the lowest part of any tooth just before the arm *a* is at the end of its downward stroke, it being understood that the arm P″ is also then so adjusted on the lever P′ as to entirely lift the emery-wheel from the teeth and a little way above the saw during the next upstroke of the arm *a*. The pawl S should also then engage the tooth against which the beveled face of the emery-wheel lies. The pitman Q should also be so adjusted with relation to the lever P′ that the movement of the free end of the latter will correspond to the length of the teeth. If the driving-shaft is now set in motion, the continued downward movement of the arm *a* will cause the emery-wheel, while being rotated, to descend until the downstroke of the arm *a* is completed, and while the emery-wheel is thus drawn downward it also moves toward the tooth adjacent to its vertical face, and so grinds off the vertical face of this tooth, as well as that part of the next tooth which is in contact with the beveled face of the emery-wheel. This lateral movement of the grinding-wheel is caused by the action of the angular slot *b* on the pin *b*′. During this part of the downward movement of the arm *a* the pawl S was carried slightly away from the tooth against which it rested. When the upstroke of the arm *a* begins the lever P′ acts on the former R′ and carries the pawl toward this tooth. As the upstroke of the arm *a* continues the wheel K moves upward and toward the pawl S, owing to the reverse movement of the pin *b*′ in the slot *b*, and by the time this pin reaches the straight part of the slot the pawl has reached the tooth and pushes the saw around until another tooth is set for the action of the sharpener during the next downstroke of the arm *a*, and during this downstroke the pawl recedes to engage another tooth. The push-pawl or feed-finger S is pivoted at one point, the loose end being adapted to rise and fall in the line of the saw, and also has a forward movement to rotate the saw, but is rigid laterally, it being very essential that the pawl should not have a lateral movement on the saw, as it has a tendency to spring the saw-plate out of line. This operation is repeated automatically until all the teeth are sharpened, it being understood that the driving-shaft may be driven by steam or other motive force.

If it is found that the sharpener is cutting the teeth away either too much or not enough, the saw, levers, arms, and pawl, or any one or more of them, may be adjusted until the work is properly done. The saw may also be set for being filed when the arm *a* is at the end of its downstroke, a corresponding adjustment of the parts being made to regulate the action of the sharpener. A little familiarity with the action of the machine will enable others to adjust it properly.

It will be perceived that the face of the former in contact with the free end of the lever P′ should correspond with the form of those parts of the teeth which are operated upon by the beveled face of the saw.

In order to file crosscut-saws, the part I is swung around until the emery-wheel is set at a proper angle to the saw-teeth, so as to make a beveled edge on the faces in contact with the vertical face of the emery-wheel. The position in the former R′ should be reversed with relation to the lever P, and the feed or stroke of the pawl S should be such as to rotate the saw by engaging each alternate tooth. When one-half the teeth are filed in this manner the part I is set to the opposite quarter, and the remaining teeth are then operated upon.

In order to file straight saws, I remove the block O′ and apply instead thereof the parts which I will now describe.

T is a beveled piece or jacket removably mounted on the arm O.

U U are sliding and beveled head-blocks mounted on the part T. A shoulder, *g*, on the part T keeps the blocks U U separated from each other.

V is a straight saw, which has the usual end ribs, *h h*.

V′ V′ are split links or clasps entering the parts U U, and V″ V″ are wedge-shaped blocks driven through the links or clasps V′ V′. If the saw V is so arranged as to be engaged or clasped by the links V′ V′, and if the blocks V″ V″ be then driven firmly into the links V′ V′, the saw will be stretched and tightened, and may thus be made to have the same tension as when applied to the saw carriage or driver. The teeth will thus be accurately filed.

All the parts adapted to be used in connection with the straight saw may be applied and removed with facility.

The adjustment of the machine when employed to sharpen straight saws should be the same as already described.

The grooved pulley K′ serves three purposes—first, as a band-pulley for transmitting motion to the emery-wheel arbor; second, as a collar for the support of the emery-wheel, and, third, the outer flanged edge as a means of preventing the oil from the arbor-bearings from flowing to the emery-wheel. The oil from the arbor-bearings coming in contact with the emery-wheel forms, in connection with the dust, a smooth surface, destroying the cutting properties of the emery, and renders the emery-wheel useless for grinding and cutting purposes, and also has a tendency to case-harden the saw-plate. The oil collects on the sharp flanged edge of the grooved pulley, and is thrown off by centrifugal force.

Having thus described my invention, what I claim as new, and desire to secure by Letters Patent, is—

1. The arm or lever R, provided on its upper end with a push-pawl or feeder and on its lower end with a guide or former, in combination with a vibrating lever connected to the sliding emery-wheel gate, substantially as and for the purposes specified.

2. The combination of the crank-shaft E, pitman Q, lever P′, swivel-jointed connecting-arm P″, the vertically-sliding gate carrying the emery-wheel or sharpener, and the laterally-swinging gate-carrier, substantially as and for the purposes specified.

3. The angular slot *b′* in the gate-frame, in combination with the pin *b* on the vertically-sliding gate, substantially as and for the purposes specified.

4. The combination of the laterally-swinging gate-carrier or top piece, saddle L, brace M, pins *c c*, pulleys L L′, the sharpening-wheel, and the driving-belts, all adapted for operation together, for the purposes set forth.

5. The guide or former R′, pivoted to the feed-lever R, and having therein the slot *f*, in combination with the fastening-pin *f″* and the sharpener-actuating lever P′, substantially as and for the purposes specified.

6. In combination, the beveled arm O, beveled removable and shouldered jacket T, removable head-pieces U U, links or clasps V′ V′, and tighteners V″ V″, substantially as and for the purposes specified.

7. In a saw-sharpening machine, the combination, with the saw, of the pawl or feed-finger S, pivoted at one point, the loose end thereof being adapted to rise and fall in the line of the saw, but rigid laterally, substantially as described.

8. In a saw-sharpening machine, the combination, with the emery-wheel K and the arbor supporting the same, of the flanged pulley K′, whereby the oil is prevented from reaching the cutting-surface of the emery-wheel, substantially as and for the purpose described.

MILO COVEL.

Witnesses:

L. M. FREEMAN,

L. B. COUPLAND.